US011925605B1

(12) United States Patent
Young et al.

(10) Patent No.: US 11,925,605 B1
(45) Date of Patent: Mar. 12, 2024

(54) BIOMETRICALLY LOCKED MEDICATION BOTTLE LID

(71) Applicants: Stephanie Young, Birmingham, AL (US); James May, Birmingham, AL (US)

(72) Inventors: Stephanie Young, Birmingham, AL (US); James May, Birmingham, AL (US)

( * ) Notice: Subject to any disclaimer, the term of this patent is extended or adjusted under 35 U.S.C. 154(b) by 226 days.

(21) Appl. No.: 17/550,015

(22) Filed: Dec. 14, 2021

(51) Int. Cl.
*A61J 7/04* (2006.01)
*A61J 1/03* (2023.01)
*A61J 1/14* (2023.01)
*G07C 9/00* (2020.01)
*G08B 7/06* (2006.01)

(52) U.S. Cl.
CPC ............... *A61J 7/0427* (2015.05); *A61J 1/03* (2013.01); *A61J 1/1437* (2013.01); *A61J 7/0418* (2015.05); *A61J 7/0481* (2013.01); *G07C 9/00563* (2013.01); *G08B 7/06* (2013.01)

(58) Field of Classification Search
CPC .......... A61J 7/0427; A61J 7/0418; A61J 1/03; A61J 1/1437; A61J 7/0481; G07C 9/00563; G08B 7/06
USPC ........................................................ 340/5.53
See application file for complete search history.

(56) References Cited

U.S. PATENT DOCUMENTS

| | | | | | |
|---|---|---|---|---|---|
| 6,382,416 | B1 | | 5/2002 | Gainey | |
| 10,872,482 | B1 | * | 12/2020 | Colton | B65D 55/14 |
| 2012/0056000 | A1 | * | 3/2012 | Shores | A61J 7/0436 235/492 |
| 2021/0205180 | A1 | * | 7/2021 | Pugsley | G16H 20/13 |

FOREIGN PATENT DOCUMENTS

| | | | | | |
|---|---|---|---|---|---|
| CN | 109843246 A | * | 6/2019 | | A61J 1/16 |

* cited by examiner

*Primary Examiner* — Kam Wan Ma
(74) *Attorney, Agent, or Firm* — Sanchelima & Associates, P.A.; Christian Sanchelima; Jesus Sanchelima

(57) ABSTRACT

A biometrically locked medication bottle lid including a bottle assembly, an alarm assembly and a lock assembly is disclosed herein. The bottle assembly includes a lid and a dispenser mechanism comprising a spring and a tray to dispense medicament. The alarm assembly includes a digital display that is attached to the front side of the bottle. A speaker and a light are also attached to the front side of the bottle and can be activated when an alarm is triggered indicating that it is time for a user to take their medication. The lock assembly includes a fingerprint sensor and a lock mechanism. The lock mechanism is actuated when the fingerprint sensor scans the fingerprint of the user.

9 Claims, 3 Drawing Sheets

BIOMETRICALLY LOCKED MEDICATION BOTTLE LID

BACKGROUND OF THE INVENTION

1. Field of the Invention

The present invention relates to a biometrically locked medication bottle lid and, more particularly, to a biometrically locked medication bottle lid that is capable of dispensing pills when the lid is unlocked via a fingerprint sensor.

2. Description of the Related Art

Several designs for a medication bottle have been designed in the past. None of them, however, include a programmable alarm and a lock mechanism that can be opened biometrically by a fingerprint.

Applicant believes that a related reference corresponds to U.S. Pat. No. 6,382,416 issued for a medicine container having a fingerprint scanner. Applicant believes that another related reference corresponds to U.S. Pat. No. 10,872,482 issued for a universal pill bottle cap with a biometric scanning locking mechanism. None of these references, however, teach of a biometrically locked medication lid that can be unlocked by a fingerprint and when an alarm is triggered, so the medication can be controlled.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a biometrically locked medication bottle lid that can be unlocked by a fingerprint and when an alarm is triggered.

It is another object of this invention to provide a biometrically locked medication bottle lid that has an alarm to indicate when to take a pill.

It is still another object of the present invention to provide a biometrically locked medication bottle lid that can avoid the abuse of medication and to prevent unauthorized access.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
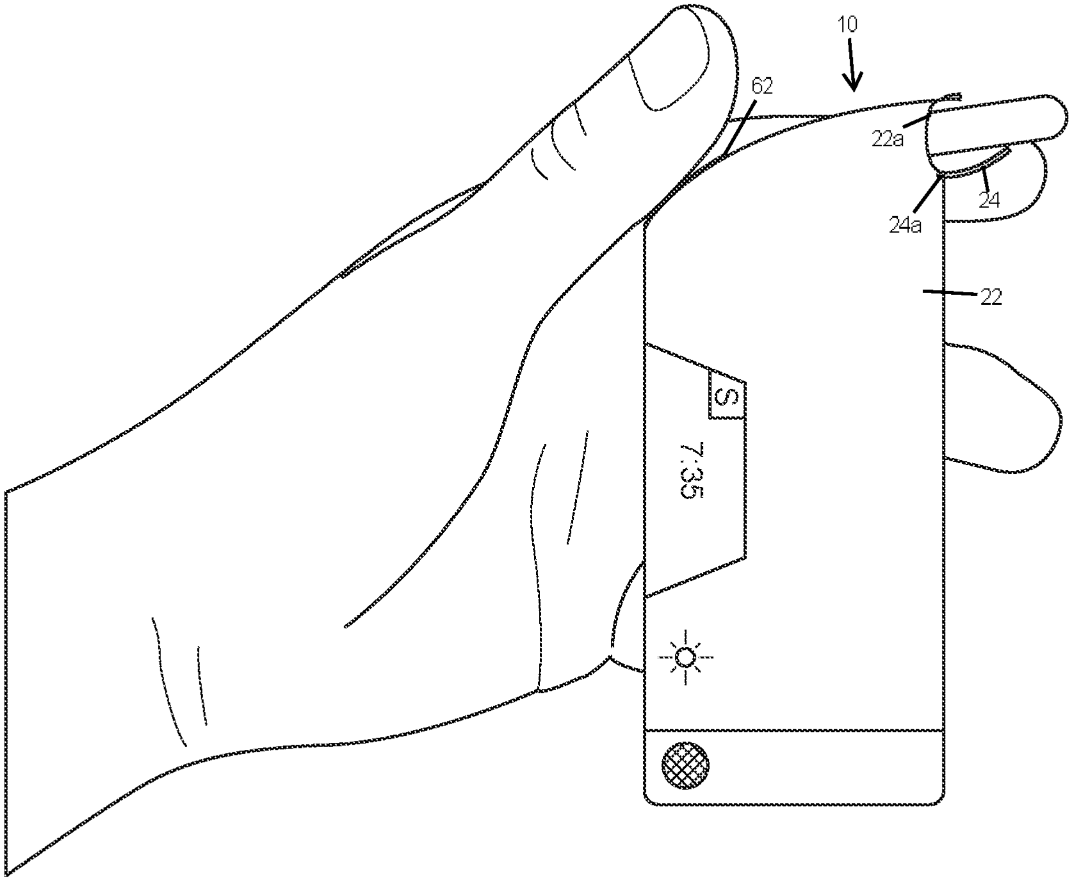
FIG. 1 represents an operational view of the present invention 10. A fingerprint of a user is touching a fingerprint sensor 62 located on top of a bottle 22. A pill is coining out of an opening 22*a* that is located at the upper portion of the right side of the bottle 22. A lid 24 is connected by a hinge 24*a* to an inferior edge of the opening 22*a*.
Figure 2:
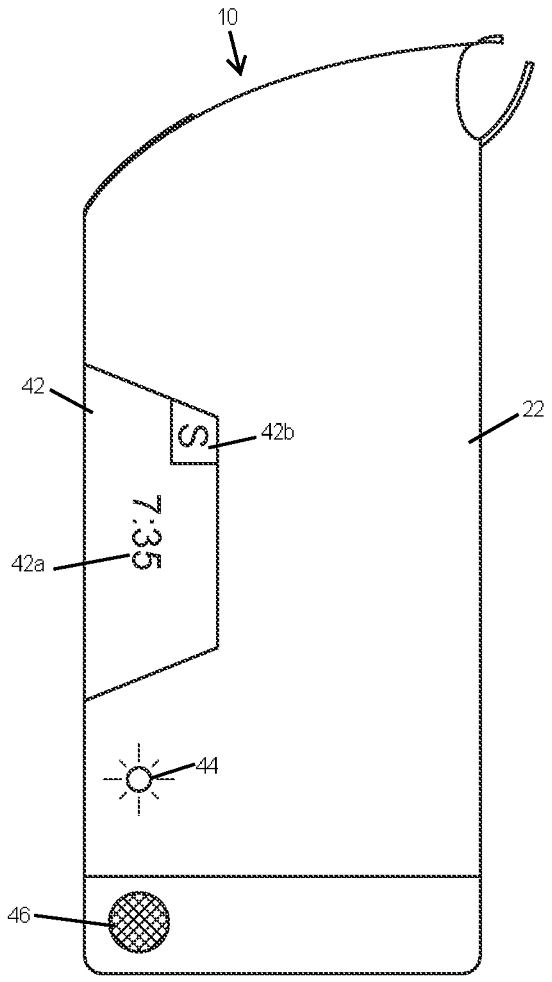
FIG. 2 shows a front view of the present invention 10. A digital display 42 is located on a front side of the bottle 22 displaying a clock 42*a* and a calendar 42*b*. A light 44 is located below the screen and a speaker 46 is located below the light.
Figure 3:
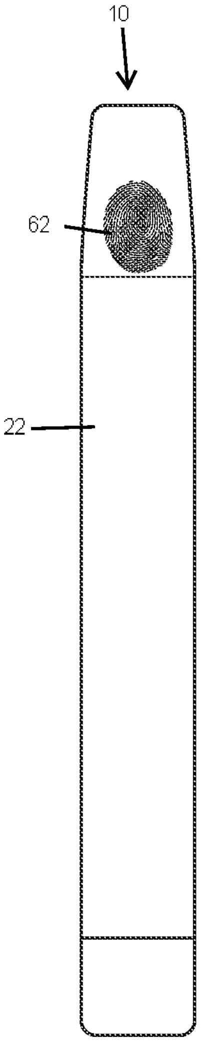
FIG. 3 illustrates a left lateral view of the present invention 10. The fingerprint sensor 62 is located at a top portion of the bottle 22.

Referring now to the drawings, where the present invention is generally referred to with numeral 10, it can be observed that it basically includes a bottle assembly 20, an alarm assembly 40 and a lock assembly 60. It should be understood there are modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The bottle assembly 20 may include a bottle 22, and a lid 24. The bottle 22 may have a base with a rectangular shape. In one embodiment, the bottle 22 may have a top side with an inclination wherein a right side of the bottle 22 may be higher than a left side of the bottle 22. The top side of the bottle 22 may have a curved shape. The bottle 22 may be made of aluminium, stainless steel or any other rigid material with high durability. The bottle 22 may have an interior coating of plastic to preserve the medicine. The bottle 22 may have an opening 22*a*. The opening 22*a* may be located on an upper portion of the right side of the bottle 22. The lid 24 may be connected by a hinge 24*a* to a lower portion of the opening 22*a*. The lid 24 may be made of aluminium, stainless steel or any other rigid material with high durability. The lid 24 may have substantially the same size and shape of the opening 22*a*. A hinge 24*a* may allow the lid 24 to close or open the bottle 22.

Figure 4:
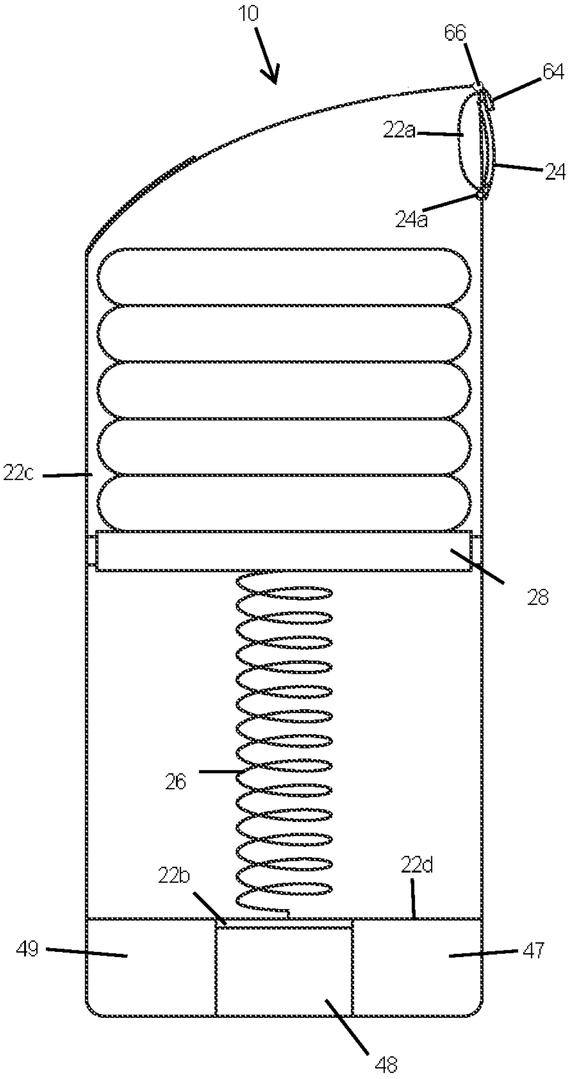
FIG. 4 is a representation of a see through view of the present invention 10. An interior of the bottle 22 is divided by a bottle wall 22*d*. A bottom interior bottle 22*b* may include a battery 47, a USB port 48 and a memory 49. A top interior bottle 22*c* may include a tray 28 connected to the bottle wall 22*d* by a spring 26.

Best observed in FIG. 4, an interior of the bottle 22 may include a bottom interior bottle 22*b* and a top interior bottle 22*c* divided by a bottle wall 22*d*. Lateral walls of the top interior bottle 22*c* may be flat, defining an interior rectangular shape. A first distal end of a spring 26 may be connected to the bottle wall 22*d*. A second distal end of the spring 26 may be connected to a bottom side of a tray 28. The tray 28 may be flat and have a rectangular shape. The tray 28 may have substantially the same length and width as the length and width of the lateral walls of the top interior bottle 22*c*. The spring 26 may push the tray 28 upward.

The alarm assembly 40 may includes a digital display 42. The digital display 42 may be embedded to an exterior surface of the bottle 22. The digital display 42 may be located on a middle portion of a left side of a front of the bottle 22. A clock 42*a* may be displayed on a center of the digital display 42. A calendar 42*b* may be displayed on a corner of the digital display 42 showing a day of the week. The digital display 42 may be configured to inform a user of a medication schedule. The alarm assembly 40 also may include a light 44. The light may be a LED. The light 44 may be located on a left portion of the front side of the bottle 22. The light 44 may be located below the digital display 42. A speaker 46 may be located on a corner portion of a bottom front of the bottle 22. The clock 42*a* also may include a programmable timer. The programmable timer may trigger an alarm to make the speaker 46 ring and the light 44 blink. The alarm assembly 40 also may include a programmable memory 49. The memory 49 may be configured to store a medication scheduled treatment. The memory 49 may be configured to synchronize the alarm of the digital display 42. The memory 49 may be embedded to a right portion of the bottom interior bottle 22*c*. The alarm assembly 40 also may include a battery 47. The battery 47 may be embedded to a left portion of the bottom interior bottle 22*c*. The battery 47 may be rechargeable. The battery may supply power to the digital display 42, the speaker 46, the light 44 and the memory 49. The battery 47 may be charged via USB by a USB port 48. The USB port 48 may be embedded to a center of the bottom interior bottle 22*c*. The memory 49 also may be programmed via USB by an app.

The lock assembly may include a fingerprint sensor 62. The fingerprint sensor 62 may be made of an array of capacitive sensors that may be configured to map ridges of a fingerprint of a user. Other embodiments of the fingerprint sensor may include optical sensors, thermal scanner and ultrasonic scanner. The fingerprint sensor 62 may be embedded to the top side of the bottle 22. The memory 49 may be configured to save a map of the ridges of a fingerprint. The fingerprint sensor 62 may compare the map saved in the memory 49 with the map that the fingerprint sensor 62 scans. If the map saved in the memory 49 matches with the fingerprint scanned by the fingerprint sensor 62, the fingerprint sensor 62 may send a first true logical signal to a servo actuator 66. If the alarm is triggered by the programmable timer, the alarm may send a second true logical signal to the servo actuator 66. In a preferred configuration, the servo actuator 62 may be activated when the first true logical signal and second true logical signal are triggered at the same time. The servo actuator 66 may be attached to an upper portion of the opening 22*a*. The servo actuator 66 may be connected to a locking bar 64. The locking bar 64 may unlock the lid 24 when the servo actuator 66 is activated, otherwise the lid 24 may be closed.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a biometrically locked medication bottle lid, comprising:

a. a bottle assembly;
b. an alarm assembly;
c. a lock assembly;
d. said bottle assembly includes a bottle and a lid, wherein said lid includes a closed configuration and opened configuration, wherein said bottle includes a spring connected to an interior bottom of the bottle and to a tray, wherein said bottle and said lid are made of aluminum, wherein said bottle has an interior coating of plastic;
e. said alarm assembly includes a digital display, wherein said digital display is configured to inform a user of a medication schedule, wherein said display is located on a front side of said bottle displaying a clock and a calendar; and
f. said lock assembly includes a fingerprint sensor and a servo actuator, wherein said fingerprint sensor is made of an array of capacitive sensors, wherein said fingerprint sensor is configured to actuate the servo actuator, wherein said servo actuator locks or unlocks the lid, wherein said bottle has a top side with an inclination, wherein a right side of said bottle is higher than a left side of said bottle, wherein said fingerprint is located on a left portion of said top side, said top side having a curved shape.

2. The system for a biometrically locked medication bottle lid of claim 1, wherein said digital display includes a clock and a programmable timer to trigger an alarm.

3. The system for a biometrically locked medication bottle lid of claim 1, wherein said servo actuator includes a locking bar configured to lock or unlock the lid.

4. The system for a biometrically locked medication bottle lid of claim 1, wherein a programmable memory stores a medication schedule.

5. The system for a biometrically locked medication bottle lid of claim 1, wherein a speaker and a light are activated when the alarm is triggered.

6. The system for a biometrically locked medication bottle lid of claim 1, wherein said servo actuator is activated when the alarm is triggered and the fingerprint sensor scans a fingerprint of an authorized user.

7. The system for a biometrically locked medication bottle lid of claim 1, wherein a rechargeable battery supplies electrical power to the alarm assembly and to the lock assembly.

8. The system for a biometrically locked medication bottle lid of claim 7, wherein said memory is programmed via USB.

9. A system for a biometrically locked medication bottle lid, consisting of:

a. a bottle assembly;
b. an alarm assembly;
c. a lock assembly;
d. said bottle assembly includes a bottle and a lid, said bottle and said lid are made of aluminum, said bottle includes a spring connected to an interior bottom of the bottle and to a tray, wherein said lid includes a closed configuration and opened configuration, wherein said bottle has an interior coating of plastic;
e. said alarm assembly includes a digital display, wherein said digital display includes a programmable timer to activate an alarm, wherein said display is located on a front side of said bottle displaying a clock and a calendar, wherein said alarm is configured to activate a speaker and a light to inform a user of a medication schedule, said alarm is synchronized with a programmable memory configured to store the medication schedule, wherein said memory is programmed via USB, said memory stores fingerprint patterns; and
f. said lock assembly includes a fingerprint sensor and a servo actuator, said fingerprint sensor is made of an array of capacitive sensors, said servo actuator is activated when said fingerprint sensor scans a fingerprint of an authorized user and said alarm is triggered, wherein said servo actuator includes a locking bar to lock or unlock the lid, wherein said bottle has a top side with an inclination, wherein a right side of said bottle is higher than a left side of said bottle, wherein said fingerprint is located on a left portion of said top side, said top side having a curved shape.

* * * * *